United States Patent
Luo et al.

(10) Patent No.: US 12,498,471 B1
(45) Date of Patent: Dec. 16, 2025

(54) LASER RANGING APPARATUS, RANGEFINDER, AND RANGING METHOD

(71) Applicant: SHENZHEN MILESEEY TECHNOLOGY CO., LTD., Guangdong (CN)

(72) Inventors: Long Luo, Guangdong (CN); Zhi Chou, Guangdong (CN); Jun Zhu, Guangdong (CN)

(*) Notice: Subject to any disclaimer, the term of this patent is extended or adjusted under 35 U.S.C. 154(b) by 0 days.

(21) Appl. No.: 19/320,248

(22) Filed: Sep. 5, 2025

(51) Int. Cl.
| | |
|---|---|
| G01S 7/497 | (2006.01) |
| G01S 7/481 | (2006.01) |
| G01S 7/484 | (2006.01) |
| G01S 7/4861 | (2020.01) |
| G01S 17/10 | (2020.01) |
| G01S 17/36 | (2006.01) |

(52) U.S. Cl.
CPC ............ *G01S 7/497* (2013.01); *G01S 7/4811* (2013.01); *G01S 7/484* (2013.01); *G01S 7/4861* (2013.01); *G01S 17/10* (2013.01); *G01S 17/36* (2013.01)

(58) Field of Classification Search
CPC ........ G01S 17/10; G01S 7/4861; G01S 7/497; G01S 17/36; G01S 17/34
See application file for complete search history.

(56) References Cited

U.S. PATENT DOCUMENTS

| | | | | |
|---|---|---|---|---|
| 2004/0105087 A1* | 6/2004 | Gogolla | ................. | G01S 17/36 356/3 |
| 2007/0127009 A1* | 6/2007 | Chen | ...................... | G01S 7/497 356/5.1 |
| 2007/0236679 A1* | 10/2007 | Luo | ......................... | G01S 17/36 356/4.01 |
| 2009/0195769 A1* | 8/2009 | Luo | ......................... | G01S 17/34 356/4.01 |
| 2019/0101630 A1* | 4/2019 | Sebastian | ................ | G01S 17/36 |
| 2021/0149049 A1* | 5/2021 | Luo | ......................... | G01S 17/26 |

\* cited by examiner

*Primary Examiner* — Yuqing Xiao
*Assistant Examiner* — Zhengqing Qi

(57) ABSTRACT

This application provides a laser ranging apparatus, a rangefinder and a ranging method. The apparatus includes a processor, a first pulse generator, a second pulse generator, a mixer, and a laser transceiver module; the processor controls the first pulse generator to output a first pulse signal and controls the second pulse generator to output a second pulse signal; the mixer is configured to combine the first and second pulse signals to generate a reference intermediate frequency signal; the laser transceiver module is configured to emit a laser pulse toward a measured object based on the first pulse signal and obtain a target intermediate frequency signal for distance calculation based on the first and second pulse signals and a measurement pulse signal; the processor verifies the target intermediate frequency signal according to the reference intermediate frequency signal and calculates a distance to the measured object using verified target intermediate frequency signal.

20 Claims, 7 Drawing Sheets

LASER RANGING APPARATUS, RANGEFINDER, AND RANGING METHOD

FIELD

This application relates to the technical field of laser ranging, and in particular to a laser ranging apparatus, a rangefinder, and a ranging method.

BACKGROUND

In recent years, laser ranging technology has made significant progress and shown broad application prospects in multiple fields. Laser rangefinders are widely used in areas such as production line automation, quality control, and construction, becoming important tools for improving production efficiency and ensuring product quality. In addition, smart homes and autonomous driving are emerging fields, opening up new growth points for the laser rangefinder market.

However, in practical applications, it has been found that laser ranging results in some scenarios often have errors, and multiple measurements are required to obtain relatively accurate results, which leads to low efficiency of laser ranging. Therefore, how to improve the efficiency of laser ranging has become an urgent problem to be solved.

SUMMARY

The main purpose of this application is to provide a laser ranging apparatus, a rangefinder and a ranging method aimed at solving the problem that current laser ranging is prone to errors, resulting in low efficiency of laser ranging.

In the first aspect, this application provides a laser ranging apparatus, including a processor, a first pulse generator, a second pulse generator, a mixer, and a laser transceiver module;
  the processor is configured to control the first pulse generator to output a first pulse signal and to control the second pulse generator to output a second pulse signal;
  the mixer is configured to combine the first pulse signal and the second pulse signal to generate a reference intermediate frequency signal;
  the laser transceiver module is configured to emit a laser pulse toward a measured object based on the first pulse signal, and obtain a target intermediate frequency signal for distance calculation based on the first pulse signal, the second pulse signal, and a measurement pulse signal returned from the measured object;
  the processor is further configured to verify the target intermediate frequency signal according to the reference intermediate frequency signal; the processor is further configured to control the first pulse generator to output a new first pulse signal and to control the second pulse generator to output a new second pulse signal when the target intermediate frequency signal fails the verification, until the obtained target intermediate frequency signal passes the verification; the processor is further configured to calculate a distance to the measured object by using the verified target intermediate frequency signal when the obtained target intermediate frequency signal passes the verification.

In the second aspect, this application further provides a rangefinder, and the rangefinder includes:
  a laser ranging apparatus described in the embodiments of this application, configured to measure a distance between the rangefinder and a measured object;
  an information output apparatus, connected to the laser ranging apparatus, and configured to output the distance between the rangefinder and the measured object.

In a third aspect, this application provides a ranging method, applied to a laser ranging apparatus, the laser ranging apparatus includes a first pulse generator, a second pulse generator, a mixer, and a laser transceiver module, and the method includes:
  controlling the first pulse generator to output a first pulse signal, and controlling the second pulse generator to output a second pulse signal;
  controlling the mixer to combine the first pulse signal and the second pulse signal to obtain a reference intermediate frequency signal;
  controlling the laser transceiver module to emit a laser pulse toward a measured object based on the first pulse signal, and obtaining a target intermediate frequency signal for distance calculation based on the first pulse signal, the second pulse signal, and a measurement pulse signal returned from the measured object;
  verifying the target intermediate frequency signal according to the reference intermediate frequency signal, controlling the first pulse generator to output a new first pulse signal and controlling the second pulse generator to output a new second pulse signal when the target intermediate frequency signal fails the verification, until the obtained target intermediate frequency signal passes the verification; calculating a distance to the measured object by using the verified target intermediate frequency signal when the obtained target intermediate frequency signal passes the verification.

BRIEF DESCRIPTION OF THE DRAWINGS

In order to clearly illustrate the technical solutions in the embodiments of this application, the following will briefly introduce the drawings used in the description of the embodiments. Apparently, the drawings in the following description are some embodiments of this application. For those of ordinary skill in the art, without making any creative efforts, other drawings can be obtained based on these drawings.

The realization of the objectives, functional features and advantages of this application will be further described with reference to the embodiments and the accompanying drawings.

DETAILED DESCRIPTION

It should be noted that the terms "first" and "second" in the specification, claims and drawings of this application are used to distinguish similar objects, rather than to describe a specific order or sequence.

It should also be noted that the methods disclosed in the embodiments of this application or the methods shown in the flowcharts include one or more steps for implementing the methods. Without departing from the scope of the claims, the execution order of multiple steps can be interchanged with each other, and some of the steps can also be deleted.

The following describes some implementations of this application in detail with reference to the accompanying drawings. In the case of no conflict, the following embodiments and the features in the embodiments can be combined with each other.

Figure 1:
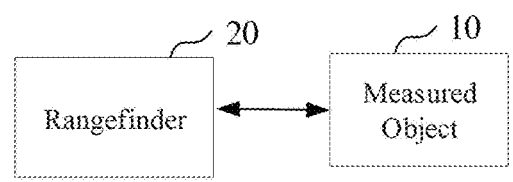
FIG. 1 is a diagram of an application scenario where a rangefinder provided by an embodiment of this application measures the distance to a measured object.

FIG. 1 is a diagram of an application scenario where a rangefinder provided by an embodiment of this application measures the distance to a measured object. As shown in FIG. 1, it includes a rangefinder 20 and a measured object 10. The rangefinder 20 is used to measure the distance to the measured object 10, so as to obtain the distance between the rangefinder 20 and the measured object 10. The rangefinder 20 can be a laser rangefinder, that is, the rangefinder 20 can calculate the distance by measuring either the round-trip time or the phase shift of the light wave traveling to and from the measured object 10 by utilizing the characteristics of laser (strong directionality and concentrated energy).

Figure 2:
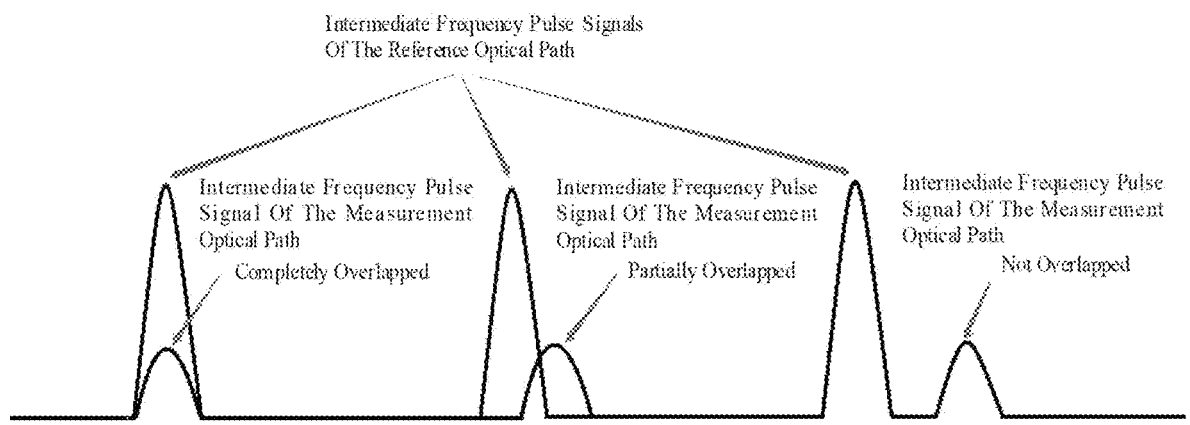
FIG. 2 is a schematic diagram of the waveforms of intermediate frequency pulse signals in the reference optical path and the measurement optical path provided by an embodiment of this application.

In related technologies, for example, the ranging method that calculates the distance based on the phase shift involves calculating the phase difference between an intermediate frequency pulse signal formed by the reference optical path and an intermediate frequency pulse signal formed by the measurement optical path, and performing ranging based on this phase difference. In this ranging method, under certain specific distances, the intermediate frequency pulse signals formed by the reference optical path and the measurement optical path may overlap (as shown in FIG. 2, the intermediate frequency pulse signals of the reference optical path and the measurement optical path may partially or completely overlap). This makes it impossible to calculate an accurate ranging result, or leads to calculating an inaccurate ranging result, and re-ranging has to be performed. As a result, it may be necessary to conduct multiple rangings to obtain a relatively accurate result, which takes a long time and thus leads to low efficiency of laser ranging.

The following is an example to illustrate the situation where intermediate frequency pulse signals overlap at specific distances. Taking the frequency of the first pulse signal F1 as 100 MHz, for example, according to the formula $D=C/(2*F1)$, wherein C is the speed of light in air, the distance D can be calculated as 1.5 m. That is, the intermediate frequency pulse signals of the reference optical path and the measurement optical path completely overlap at distances of 1.5 m and its integer multiples. Even partial overlap will distort the pulses, which ultimately affects the accuracy of the ranging results. Therefore, it is considered that there is no overlap only when the interval between the two pulses is greater than the pulse width. The above-mentioned first pulse signal F1 with 100 MHz cannot measure distances around 1.5 m and its integer multiples. Therefore, when selecting the frequency of a new first pulse signal F1, it is necessary to avoid distances around 1.5 m and its integer multiples as much as possible. By analogy, the measurement of all distances within the measurement range can be realized through a series of frequencies of new first pulse signals F1.

Next, a laser ranging apparatus provided by the embodiments of this application will be introduced with in combination with FIGS. 3 to 9. This laser ranging apparatus can be provided in the above-mentioned rangefinder 20.

Figure 3:
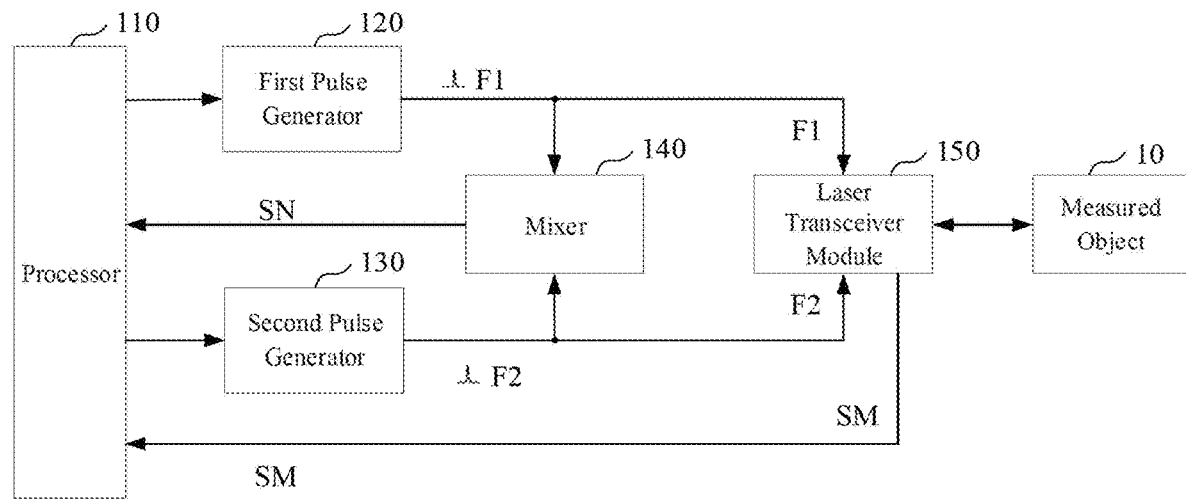
FIG. 3 is a schematic diagram of the laser ranging apparatus provided by an embodiment of this application.

As shown in FIG. 3, FIG. 3 is a schematic diagram of the laser ranging apparatus provided by an embodiment of this application.

Specifically, the laser ranging apparatus 100 includes a processor 110, a first pulse generator 120, a second pulse generator 130, a mixer 140, and a laser transceiver module 150.

Among them, the processor 110 is configured to control the first pulse generator 120 to output the first pulse signal F1 and control the second pulse generator 130 to output the second pulse signal F2. The mixer 140 is configured to combine the first pulse signal F1 and the second pulse signal F2 to generate a reference intermediate frequency signal SN. The laser transceiver module 150 is configured to emit a laser pulse toward the measured object 10 based on the first pulse signal F1, and obtain a target intermediate frequency signal SM for distance calculation based on the first pulse signal F1, the second pulse signal F2, and the measurement pulse signal returned from the measured object 10.

The processor 110 is further configured to verify the target intermediate frequency signal SM according to the reference intermediate frequency signal SN; the processor 110 is further configured to control the first pulse generator 120 to output a new first pulse signal F1 and control the second pulse generator 130 to output a new second pulse signal F2 when the target intermediate frequency signal SM fails the verification, until the obtained target intermediate frequency signal SM passes the verification. The processor 110 is further configured to calculate the distance to the measured object 10 by using the verified target intermediate frequency signal SM when the obtained target intermediate frequency signal SM passes the verification.

It should be noted that the first pulse signal F1 and the second pulse signal F2 can be high-speed narrow pulse signals. High-speed narrow pulse signals generated by the laser have extremely high peak optical power. Under the condition that the average optical power is the same, their instantaneous power is much higher than that of continuous-wave lasers. This enables laser pulses to maintain sufficient reflected signal strength when propagating over long distances, effectively overcoming the impact of atmospheric attenuation and scattering. For example, the frequency range of the first pulse signal F1 and the second pulse signal F2 can be 1 MHz to 250 MHz. The higher the frequency, the higher the measurement accuracy; the lower the frequency, the fewer the positions where overlap occurs. Through a series of combinations of high and low frequencies, long-distance detection and high-speed response can be ensured, which can be applied in scenarios such as military, aerospace, industrial automation, and field surveying.

It should be noted that there can be a frequency difference between the first pulse signal F1 and the second pulse signal F2. For example, the frequency of the first pulse signal F1 can be higher than that of the second pulse signal F2, or the frequency of the second pulse signal F2 can be higher than that of the first pulse signal F1. The frequency difference between the first pulse signal F1 and the second pulse signal F2 can be fixed, and the range of the frequency difference (i.e., frequency difference Δf) between the first pulse signal F1 and the second pulse signal F2 needs to be strictly controlled. An excessively large frequency difference will damage the ranging accuracy and stability of the system. Therefore, the range of the frequency difference between the first pulse signal F1 and the second pulse signal F2 can be 500 Hz to 100 KHz, which can maintain good ranging accuracy and system robustness.

It should be noted that the mixer 140 can obtain the beat note pulse signal of the first pulse signal F1 and the second pulse signal F2 by performing nonlinear mixing on the first pulse signal F1 and the second pulse signal F2. The beat note pulse signal can also be selected from the output of the mixer 140 through a filter. This beat note pulse signal is a fixed intermediate frequency output and can be used as the reference intermediate frequency signal SN. The reference intermediate frequency signal SN has a fixed phase, and its frequency is equal to the frequency difference between the first pulse signal F1 and the second pulse signal F2. Its function is to verify the target intermediate frequency signal SM used for distance calculation. The target intermediate frequency signal SM can be a mixed intermediate frequency signal containing the intermediate frequency pulse signals of the reference optical path and the measurement optical path. The verification principle is as follows: the reference intermediate frequency signal SN has the same frequency as the target intermediate frequency signal SM, and has a relatively fixed phase with the intermediate frequency pulse signal of the reference optical path in the target intermediate frequency signal SM. This makes it possible to quickly identify the intermediate frequency pulse signal of the reference optical path in the target intermediate frequency signal SM, and conveniently calculate whether the phase difference with the intermediate frequency pulse signal of the measurement optical path overlaps. If they overlap, the verification fails; if they do not overlap, the verification passes. The amplitude and position of the intermediate frequency pulse signal of the measurement optical path will change with the distance and the reflecting surface. Its amplitude may be larger or smaller than that of the intermediate frequency pulse signal of the reference optical path, and its position may be in front of or behind that of the intermediate frequency pulse signal of the reference optical path. Without the reference intermediate frequency signal SN, it becomes very troublesome to identify the intermediate frequency pulse signal of the reference optical path. There may be multiple pulse echoes in the intermediate frequency pulse signal of the measurement optical path. Through the reference intermediate frequency signal SN, the intermediate frequency pulse signal of the reference optical path can be quickly identified, which avoids mistaking multiple intermediate frequency pulse signals from the measurement optical path for the one from the reference optical path. In addition, it can exclude interference pulses from the measurement results, thereby enhancing the measurement accuracy and speed in complex measurement environments with rain, fog, dust, glass, etc.

It should be noted that the laser transceiver module 150 can emit a laser pulse to the measured object 10 based on the first pulse signal F1, and receive the measurement pulse signal that is reflected back from the measured object 10 when the laser pulse irradiates it. The laser transceiver module 150 can also mix the first pulse signal F1, the second pulse signal F2 and the measurement pulse signal to obtain the target intermediate frequency signal SM for distance calculation. For example, the pulse signal S1 is obtained through the reference optical path based on the first pulse signal F1, the local oscillator pulse signal S0 is obtained based on the second pulse signal F2, and the pulse signal S2 is obtained through the measurement optical path. The pulse signal S2 is the measurement pulse signal, and the target intermediate frequency signal SM=(S1+S2)*S0.

It should be noted that when the target intermediate frequency signal SM fails the verification, the first pulse generator 120 is controlled to output a new first pulse signal F1, and the second pulse generator 130 is controlled to output a new second pulse signal F2. The frequency of the new first pulse signal F1 is different from that of the immediately preceding first pulse signal, and the frequency of the new second pulse signal F2 is different from that of the immediately preceding second pulse signal. That is to say, the frequency of the new first pulse signal F1 is different from that of its immediately preceding first pulse signal. The same applies to the new second pulse signal F2, whose frequency is different from that of its immediately preceding second pulse signal. In some embodiments, the new first pulse signal F1 and the new second pulse signal F2 can be arranged according to a specific frequency sequence to reduce the number of switches between the new first pulse signal F1 and the new second pulse signal F2. This allows most ranging to require only 1 to 2 switches, and only a small number of specific ranging to require more switches, thereby further improving the ranging efficiency.

It should be noted that after the obtained target intermediate frequency signal SM passes the verification, when the distance to the measured object 10 is calculated using the verified target intermediate frequency signal SM, ranging methods such as the phase ranging method (continuous wave modulation) and the pulse ranging method (time of flight, ToF) can be adopted, and the embodiments of this application do not specifically limit this. The embodiments of this application take the phase ranging method as an example to explain the specific implementation manner, which does not mean a limitation on the embodiments of this application.

In the embodiment of this application, by configuring the mixer 140 to combine the first pulse signal F1 and the second pulse signal F2, a reference intermediate frequency signal SN is generated. Thus, the target intermediate frequency signal SM used for distance calculation can be verified according to the reference intermediate frequency signal SN. When the target intermediate frequency signal SM fails the verification, it indicates that there is a problem with the target intermediate frequency signal SM. For example, the phase difference between the intermediate frequency pulse signals of the reference optical path and the measurement optical path in the target intermediate frequency signal SM overlaps, thereby affecting the ranging result. Therefore, in the embodiment of this application, when the target intermediate frequency signal SM fails the verification, there is no need to wait for an inaccurate ranging result calculated according to the target intermediate frequency signal SM. Instead, a new first pulse signal and a new second pulse signal are output for re-ranging, which can save the time for re-ranging and thus improve the efficiency of laser ranging.

Figure 4:
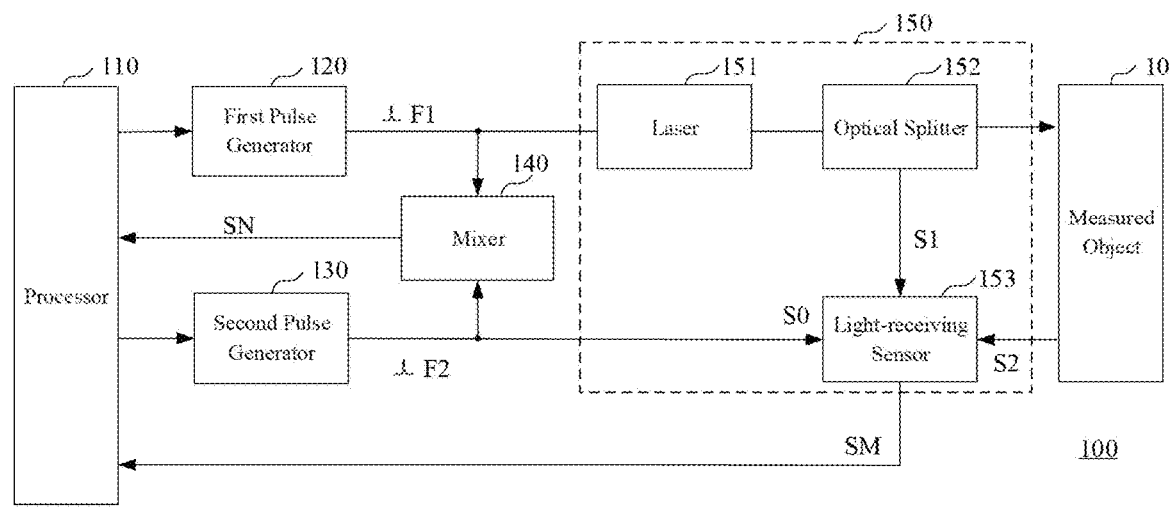
FIG. 4 is a schematic diagram of the laser ranging apparatus provided by another embodiment of this application.

In one embodiment, as shown in FIG. 4, the laser transceiver module 150 includes a laser 151, an optical splitter 152, and a light-receiving sensor 153; the laser 151 is used to generate a laser pulse based on the first pulse signal F1; the optical splitter 152 is used to split the laser pulse into two paths, wherein one path is transmitted to the light-receiving sensor 153, and the other path is emitted toward the measured object 10.

The light-receiving sensor 153 is used to generate a reference pulse signal S1 based on one path of the split laser pulses, generate a measurement pulse signal S2 based on the reflected laser pulse of the other path, and superimpose the reference pulse signal S1 and the measurement pulse signal S2 to obtain a target pulse signal S1+S2. The light-receiving sensor 153 is also used to apply a reverse bias to the second pulse signal F2 to obtain a local oscillator pulse signal S0, and mix the local oscillator pulse signal S0 with the target pulse signal S1+S2 to obtain a target intermediate frequency signal SM.

It should be noted that the first pulse signal F1 is sent to the laser 151, forming a pulse current modulation on the laser 151, so that the laser 151 emits continuous laser pluses. The laser pulse is split into two paths by an optical splitter 152. One path of the split laser pulses is transmitted to the light-receiving sensor 153 along a known reflection path (reference optical path). The known reflection path can be an optical channel device between the optical splitter 152 and the light-receiving sensor 153. The optical channel device can attenuate the light to prevent the light-receiving sensor 153 from being saturated due to too strong light. Of course, there may also be no such device, and the transmission is carried out through the air medium. The other path of the split laser pulses is emitted to the measured object 10, and returns to the light-receiving sensor 153 after being reflected by the measured object 10 (measurement optical path).

For example, one path of the laser pulses generated based on the first pulse signal F1 is transmitted to the light-receiving sensor 153 to obtain a reference pulse signal S1. A reverse bias is applied to the second pulse signal F2 to form a local oscillator pulse signal S0 on the light-receiving sensor 153. The other path of the laser pulses generated based on the first pulse signal F1 is transmitted to the light-receiving sensor 153 to obtain a measurement pulse signal S2. The reference pulse signal S1 and the measurement pulse signal S2 are superimposed to obtain a target pulse signal S1+S2. The local oscillator pulse signal S0 is mixed with the target pulse signal S1+S2 to obtain the target intermediate frequency signal, which can be SM=(S1+S2)*S0.

It should be noted that the target intermediate frequency signal SM may include the intermediate frequency pulse signal of the reference optical path, such as S1*S0, and the intermediate frequency pulse signal of the measurement optical path, such as S2*S0. The intermediate frequency pulse signal S1*S0 of the reference optical path and the intermediate frequency pulse signal S2*S0 of the measurement optical path can be superimposed together, and there is a difference such as a time difference or a phase difference between the two intermediate frequency pulse signals S1*S0 and S2*S0. S2*S0 may be one pulse or multiple pulses within one period, depending on the complexity of the reflecting surface and the environment, such as rain, fog, dust, glass, etc. SN and S1*S0 have a fixed time difference or phase difference, while the time difference or phase difference between SN and S2*S0 changes with the distance to the measured object. By virtue of this characteristic, S1*S0 can be quickly found. Based on the information such as the time difference or phase difference between the two intermediate frequency pulse signals S1*S0 and S2*S0, the corresponding ranging method can be adopted to accurately calculate the distance to the measured object 10. Similarly, the two intermediate frequency pulse signals S1*S0 and S2*S0 in the target intermediate frequency signal SM can be verified according to the reference intermediate frequency signal SN. For example, matching is performed according to the phase of the reference intermediate frequency signal SN and the phase difference between the two intermediate frequency pulse signals S1*S0 and S2*S0 in SM. If they match, the two intermediate frequency pulse signals S1*S0 and S2*S0 do not overlap; if they do not match, they overlap.

Figure 5:
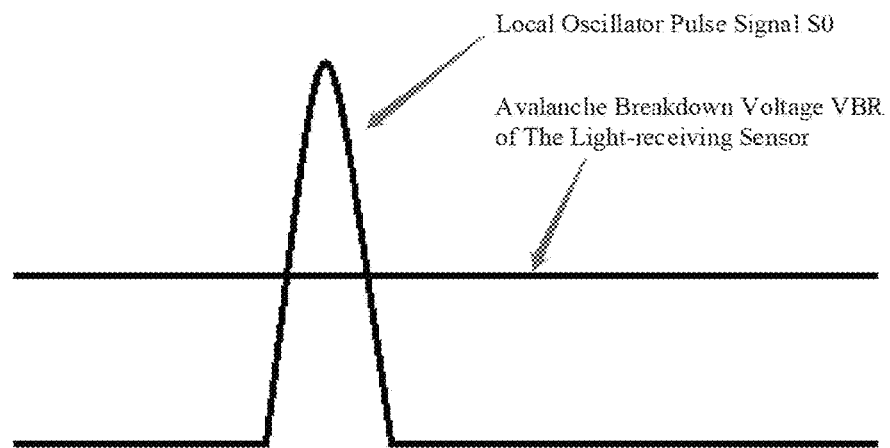
FIG. 5 is a schematic diagram of the waveform of a local oscillator pulse signal provided by an embodiment of this application.

In one embodiment, the pulse peak voltage of the local oscillator pulse signal S0 is greater than the avalanche breakdown voltage of the light-receiving sensor 153. As shown in FIG. 5, when the pulse peak voltage of the local oscillator pulse signal S0 is greater than the avalanche breakdown voltage VBR of the light-receiving sensor 153, the light-receiving sensor 153 can enter the avalanche mode and can also work in the Geiger mode (single-photon detection mode) to obtain higher peak gain. The duration during which the pulse peak voltage of the local oscillator pulse signal S0 exceeds the avalanche breakdown voltage is very short, and it quickly drops to a level far lower than the avalanche breakdown voltage. This avoids the impact of strong light on the light-receiving sensor 153, enhances the detection capability for weak signals, and thus greatly improves the detection effect of the light-receiving sensor 153.

It should be noted that the avalanche current must be rapidly quenched by a quenching circuit to prevent device burnout. Quenching methods can be active (external control) or passive (current limiting via a series resistor). A common SPAD (Single-photon avalanche photodiode) adopts the passive method in which a series resistor limit the current. After a single photon is received and triggers an avalanche, the current is limited by a series resistor; even if more photons are received, the generated current does not change. Therefore, it can only detect the presence or absence of photons but cannot detect light intensity. It is necessary to form an array of multiple SPADs to count the probability of photons hitting the SPADs or accumulate the currents generated after photons hit the SPADs to reflect the light intensity. Active quenching utilizes the characteristic that the SPAD takes a certain time to saturate after avalanche occurs. It controls the avalanche breakdown time through a high-voltage narrow pulse and reduces the high voltage to exit the avalanche before saturation occurs. In this way, the SPAD can maintain linear gain, so a single SPAD can also be used, which cannot be achieved by other current passive methods.

Therefore, the range of voltage differences between the pulse peak voltage and the avalanche breakdown voltage can be 1V to 20V. Alternatively, for each peak of the local oscillator pulse signal S0, the time range during which the corresponding voltage of the local oscillator pulse signal S0 is greater than the avalanche breakdown voltage can be 10 picoseconds to 10 nanoseconds. A small voltage difference or short time will result in low gain and poor performance, while a large voltage difference or long time will lead to high gain and easy saturation. By reasonably controlling the range of voltage differences between the pulse peak voltage and the avalanche breakdown voltage, and/or reasonably controlling the time range during which the corresponding voltage of each peak of the local oscillator pulse signal S0 is greater than the avalanche breakdown voltage, it can ensure that the light-receiving sensor 153 will not be saturated, while maintaining a sufficiently high gain. The peak gain between 1K and 10K times works best, which greatly improves the detection effect of the light-receiving sensor 153 on weak signals.

In some examples, the light-receiving sensor 153 is a single light-receiving sensor or a light-receiving sensor array, such as an APD (Avalanche Photodiode) sensor, a single SPAD (Single-photon Avalanche Photodiode) sensor, a SPAD sensor array (including SiPM (Silicon Photomultiplier) sensors, MPPC (Multi-pixel Photon Counter) sensors, etc.), and so on. The photosensitive area of a single SPAD is smaller than that of a SPAD array, so it is less affected by light. Using a single SPAD is lower in cost and better in performance than using a SPAD array. Experiments have shown that an APD can also enter the Geiger mode, which can maximize the weak signal detection capability of the APD, approaching the effect of a single SPAD. Therefore, an APD with more mature technology and lower cost can also be used, thereby reducing the cost of the laser ranging apparatus 100.

Figure 6:
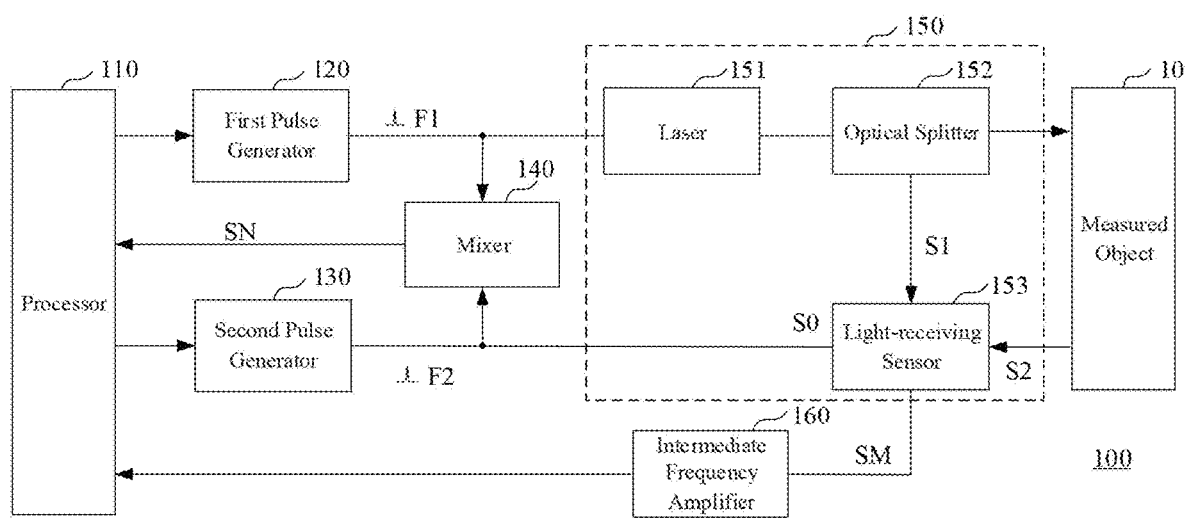
FIG. 6 is a schematic diagram of the laser ranging apparatus provided by another embodiment of this application.

In one embodiment, as shown in FIG. 6, the laser ranging apparatus 100 further includes an intermediate frequency amplifier 160. The intermediate frequency amplifier 160 is used to amplify the target intermediate frequency signal SM and then output the amplified target intermediate frequency signal to the processor 110. The intermediate frequency amplifier 160 can amplify the target intermediate frequency signal SM at a fixed intermediate frequency, while reducing the requirement for the bandwidth of the filter and suppressing out-of-band noise.

Figure 7:
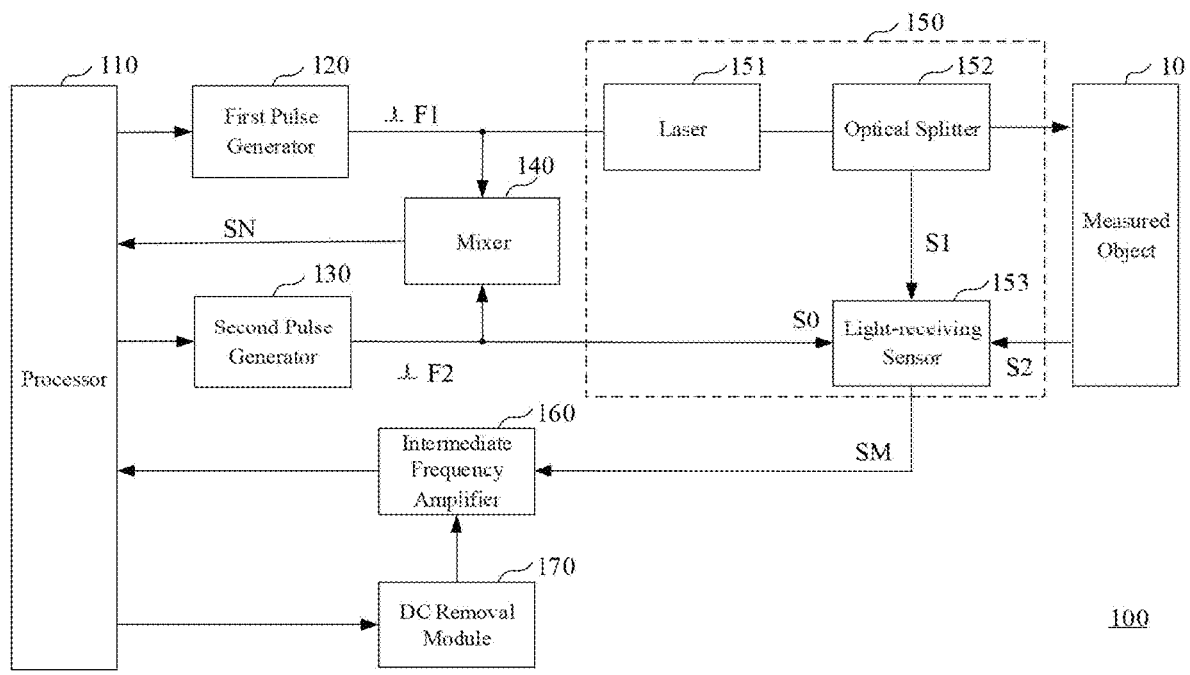
FIG. 7 is a schematic diagram of the laser ranging apparatus provided by another embodiment of this application.

In one embodiment, as shown in FIG. 7, the laser ranging apparatus 100 further includes a DC (Direct Current) removal module 170. The DC removal module 170 is configured to output a target electrical signal to the intermediate frequency amplifier 160, and the target electrical signal is used to eliminate the DC component in the intermediate frequency amplifier 160. Wherein the target electrical signal may include a voltage signal or a current signal. The target electrical signal is approximately equal in magnitude to the DC component in the intermediate frequency amplifier 160, and the phase can be in-phase or anti-phase. If the target electrical signal is additively coupled to the intermediate frequency amplifier 160, the phase is anti-phase; if the target electrical signal is subtractively coupled to the intermediate frequency amplifier 160, the phase is in-phase. The DC removal module 170 is a module that can output electrical signals, such as a digital-to-analog converter (DAC), PWM filter, a digital potentiometer, a resistor switch array, etc. The interface between the DC removal module 170 and the processor 110 can be a digital signal or an analog signal. For example, if the DAC is inside the processor 110, the processor 110 outputs an analog signal; the processor 110 can also output PWM, and the required target electrical signal is obtained after filtering to eliminate high-frequency components; the processor 110 can also obtain the target electrical signal by changing the voltage division ratio of the digital potentiometer. The principle of the resistor switch array is similar to that of the digital potentiometer, and the target electrical signal is obtained by switching to resistors with different voltage division ratios through switches.

Figure 8:
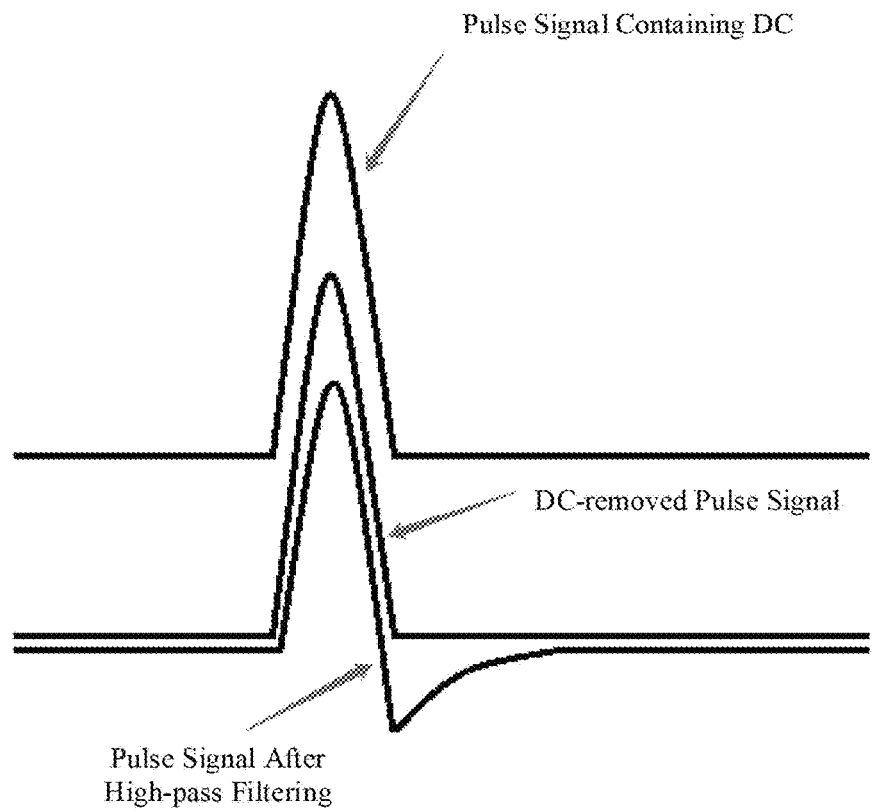
FIG. 8 is a schematic diagram of waveforms of various pulse signals provided by an embodiment of this application.

As shown in FIG. 8, experiments have found that the light-receiving sensor 153 will generate invalid photocurrent due to ambient light, thereby producing a pulse signal containing direct current. Therefore, it is necessary to remove the DC component in the intermediate frequency amplifier 160 before intermediate frequency amplification. This is because the invalid DC component is much larger than the useful signal, and it will be saturated after amplification, which affects the accuracy of the target intermediate frequency signal SM and further affects the accuracy of the ranging result. By configuring the DC removal module 170 to output a target electrical signal to the intermediate frequency amplifier 160, the invalid photocurrent generated by the light-receiving sensor 153 due to ambient light can be eliminated, and the DC component in the intermediate frequency amplifier 160 can be removed at the same time, obtaining the DC-removed pulse signal shown in FIG. 8. This can improve the accuracy of the target intermediate frequency signal SM and further enhance the accuracy of the ranging result.

It is understandable that applications such as traditional phase measurement, lidar, and optical fiber communication eliminate direct current through high-pass filtering. In traditional phase measurement technology, the target intermediate frequency signal SM is a continuous sinusoid with a single frequency, and the phase delay caused by high-pass filtering can be calibrated. In pulse measurement technology, the target intermediate frequency signal SM is a pulse wave. Since the pulse contains many high-order harmonics, the pulse will be distorted after high-pass filtering, thereby introducing measurement errors, such as the pulse signal after high-pass filtering as shown in FIG. 8. For Lidar requiring the centimeter-level precision, the error caused by pulse distortion can be ignored. However, when requiring millimeter-level measurement precision, the error caused by pulse distortion cannot be ignored. On the other hand, since the frequency of the target intermediate frequency signal SM after mixing is relatively low, the cut-off frequency of the high-pass filtering can also be set relatively low. When the direct current changes due to changes in light intensity, the high-pass filter requires a long response time, resulting in a slowdown in measurement speed.

To determine range, it is necessary to calculate the centroid of the pulse waveform. After high-pass filtering, the pulse is significantly distorted and has an inverted overshoot, shifting the computed centroid. This shift is also affected by the pulse amplitude and cannot be eliminated through calibration, thus degrading the ranging accuracy. The DC-removed pulse signal only eliminates the DC component, while the shape of the pulse signal remains unchanged. Therefore, it does not introduce measurement errors and maintains the highest measurement accuracy.

In one embodiment, as shown in FIG. 7, the processor 110 is connected to the DC removal module 170. The processor 110 is used to obtain the DC component information of the intermediate frequency amplifier 160 and control the DC removal module 170 to output the target electrical signal based on the DC component information. By having the processor 110 obtain the DC component information of the intermediate frequency amplifier 160, where the DC component information includes, for example, the magnitude of DC voltage, the magnitude of DC current, etc., the DC removal module 170 can be controlled to output the target electrical signal. The target electrical signal output by the DC removal module 170 is calculated by the processor 110 based on the DC component of the intermediate frequency amplifier 160, thereby accurately eliminating the DC component in the intermediate frequency amplifier 160. The processor 110 can also obtain the DC component information from the intermediate frequency amplifier 160 again. If the DC component is smaller than a certain value, it is considered that the DC component has been eliminated; if not, the above process will be executed again until the DC component is eliminated. Normally, it only needs to be executed once to achieve elimination.

Figure 9:
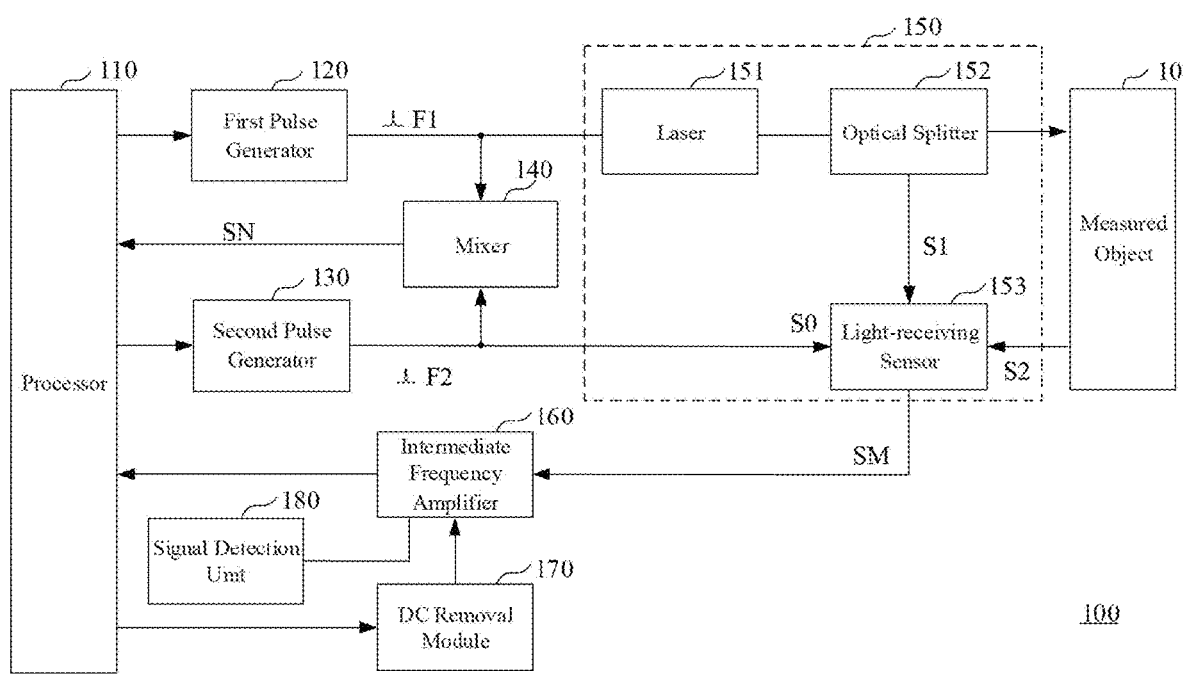
FIG. 9 is a schematic diagram of the laser ranging apparatus provided by another embodiment of this application.

In one embodiment, as shown in FIG. 9, the laser ranging apparatus 100 further includes a signal detection unit 180. The signal detection unit 180 is connected to the intermediate frequency amplifier 160 and is used to detect the DC component information of the intermediate frequency amplifier 160. The signal detection unit 180 is, for example, a DC detection circuit, a current detector, etc., which can detect the DC component information of the intermediate frequency amplifier 160. The signal detection unit 180 can be connected to the DC removal module 170 (not shown in the figure) and control the DC removal module 170 to output the target electrical signal based on the detected DC component information. The signal detection unit 180 can also be connected to the processor 110 (not shown in the figure) and send the detected DC component information to the processor 110, so that the processor 110 can control the DC removal module 170 to output the target electrical signal based on the DC component information.

In one embodiment, multiple sets of pulse signal pairs are provided, where each set of pulse signal pairs includes a first pulse signal F1 and a second pulse signal F2. The frequencies of the first pulse signals F1 in different pulse signal pairs are different, and the frequencies of the second pulse signals F2 in different pulse signal pairs are also different. For multiple different distances, the processor 110 is further configured to control the first pulse generator 120 and the second pulse generator 130 to output a set of pulse signal pairs within multiple time intervals respectively, so as to obtain multiple ranging results corresponding to the multiple different distances. It then determines the optimal ranging result corresponding to each distance from the multiple ranging results, and determines the target pulse signal pair corresponding to each distance based on the optimal ranging result for that distance. This makes it possible to find the most suitable frequencies of the first pulse signal F1 and the second pulse signal F2 for different distances.

The laser ranging apparatus 100 of the above embodiment includes a processor 110, a first pulse generator 120, a second pulse generator 130, a mixer 140, and a laser transceiver module 150. The processor 110 is used to control the first pulse generator 120 to output the first pulse signal F1 and control the second pulse generator 130 to output the second pulse signal F2; the mixer 140 is used to combine the first pulse signal F1 and the second pulse signal F2 to obtain a reference intermediate frequency signal SN, so that the target intermediate frequency signal SM used for distance calculation can be verified according to the reference intermediate frequency signal SN to determine whether there is a problem with the target intermediate frequency signal SM. When the target intermediate frequency signal SM fails the verification, there is no need to wait for the inaccurate ranging result calculated according to the target intermediate frequency signal SM. Instead, the first pulse generator 120 is controlled to output a new first pulse signal F1 and the second pulse generator 130 is controlled to output a new second pulse signal F2 for re-ranging. This can save the time for re-ranging, thereby improving the efficiency of laser ranging.

In practical applications, phase ranging offers high precision, reaching the millimeter level, but it has a slow measurement speed, short range, and is susceptible to strong light interference. Pulse ranging features fast measurement speed and long range, and is not susceptible to strong light interference, but its precision is relatively poor, with the highest precision only reaching the centimeter level. Therefore, on the premise that laser rangefinders achieve millimeter-level measurement precision, improving measurement speed and enhancing ranging capability under strong light has become an urgent problem to be solved. Based on this, the laser ranging apparatus 100 provided in the embodiments of this application can combine the advantages of pulse ranging and phase ranging to achieve millimeter-level measurement precision, and improve measurement speed and range under strong light.

Figure 10:
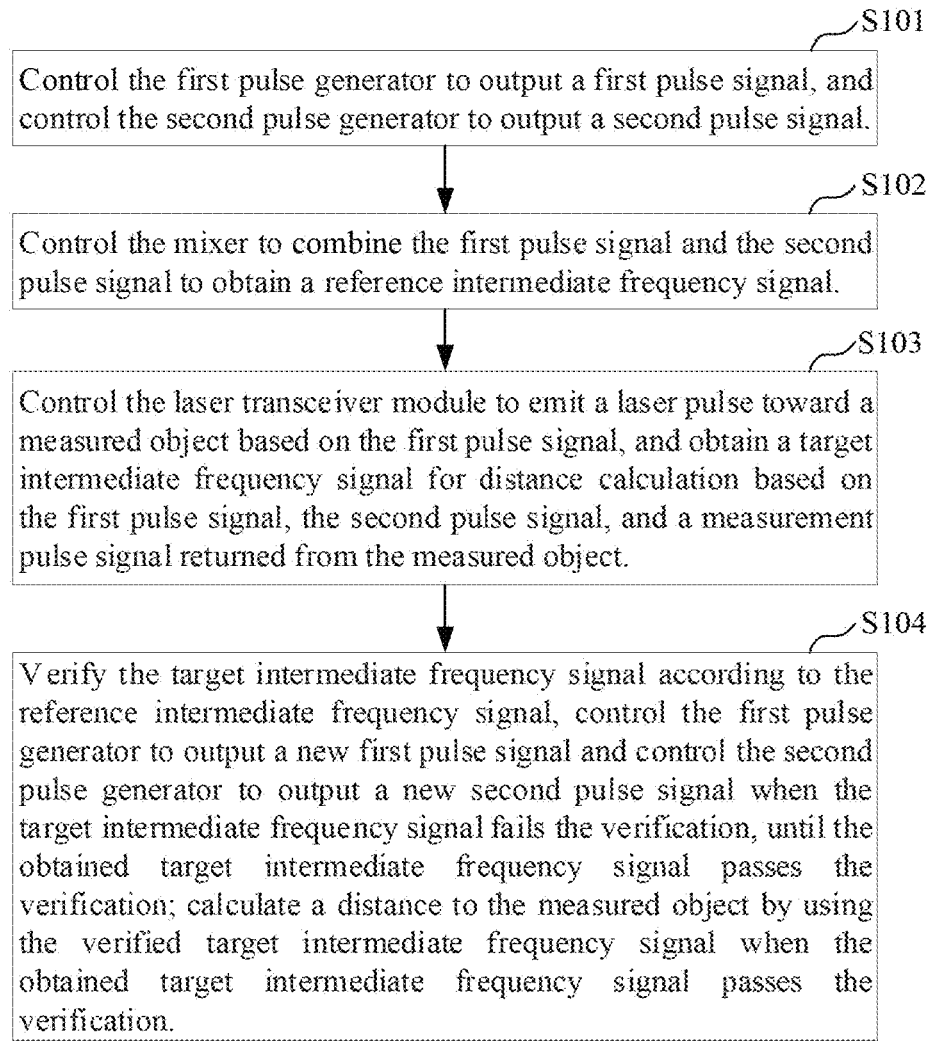
FIG. 10 is a schematic flow chart of a ranging method provided by an embodiment of this application.

Please refer to FIG. 10, FIG. 10 is a schematic flow chart of a ranging method provided by an embodiment of this application. This ranging method can be applied to the above-mentioned laser ranging apparatus 100, for example, to the processor in the above-mentioned laser ranging apparatus 100. The laser ranging apparatus 100 includes a first pulse generator, a second pulse generator, a mixer, and a laser transceiver module.

As shown in FIG. 10, the ranging method includes steps 101 to 104.

In step 101, control the first pulse generator to output a first pulse signal, and control the second pulse generator to output a second pulse signal.

In this step, the first pulse signal F1 and the second pulse signal F2 can be high-speed pulse signals. For example, the frequency range of the first pulse signal F1 and the second pulse signal F2 can be 1 MHz to 250 MHz, so as to ensure long-distance detection and high-speed response.

In this step, there can be a frequency difference between the first pulse signal F1 and the second pulse signal F2. For example, the frequency of the first pulse signal F1 can be higher than that of the second pulse signal F2, or the frequency of the second pulse signal F2 can be higher than that of the first pulse signal F1. The range of the frequency difference between the first pulse signal F1 and the second pulse signal F2 can be 500 Hz to 100 KHz, which can maintain good ranging accuracy and system robustness.

In step 102, control the mixer to combine the first pulse signal and the second pulse signal to obtain a reference intermediate frequency signal.

In this step, the mixer can obtain the beat note pulse signal of the first pulse signal F1 and the second pulse signal F2 by performing nonlinear mixing on the first pulse signal F1 and the second pulse signal F2. This beat note pulse signal is a fixed intermediate frequency output and can be used as the reference intermediate frequency signal SN.

It should be noted that the reference intermediate frequency signal SN has a fixed phase, and its frequency is equal to the frequency difference between the first pulse signal F1 and the second pulse signal F2. Its function is to verify the target intermediate frequency signal SM used for distance calculation.

In step 103, control the laser transceiver module to emit a laser pulse toward a measured object based on the first pulse signal, and obtain a target intermediate frequency signal for distance calculation based on the first pulse signal, the second pulse signal, and a measurement pulse signal returned from the measured object.

In this step, one path of the laser pulses generated based on the first pulse signal F1 is transmitted to the light-receiving sensor 153 to obtain a reference pulse signal S1. A reverse bias is applied to the second pulse signal F2 to form a local oscillator pulse signal S0 on the light-receiving sensor 153. The other path of the laser pulses generated based on the first pulse signal F1 is transmitted to the light-receiving sensor 153 to obtain a measurement pulse signal S2. The reference pulse signal S1 and the measurement pulse signal S2 are superimposed to obtain a target pulse signal S1+S2. The local oscillator pulse signal S0 is mixed with the target pulse signal S1+S2 to obtain the target intermediate frequency signal, which can be SM=(S1+S2)*S0.

In this step, the target intermediate frequency signal SM may include the intermediate frequency pulse signal of the reference optical path, such as S1*S0, and the intermediate frequency pulse signal of the measurement optical path, such as S2*S0. The intermediate frequency pulse signal S1*S0 of the reference optical path and the intermediate frequency pulse signal S2*S0 of the measurement optical path can be superimposed together, and there is a difference such as a time difference or a phase difference between the two intermediate frequency pulse signals S1*S0 and S2*S0. S2*S0 may be one pulse or multiple pulses within one period, depending on the complexity of the reflecting surface and the environment, such as rain, fog, dust, glass, etc. SN and S1*S0 have a fixed time difference or phase difference, while the time difference or phase difference between SN and S2*S0 changes with the distance to the measured object. By virtue of this characteristic, S1*S0 can be quickly found. Based on the information such as the time difference or phase difference between the two intermediate frequency pulse signals S1*S0 and S2*S0, the corresponding ranging method can be adopted to accurately calculate the distance to the measured object 10. Similarly, the two intermediate frequency pulse signals S1*S0 and S2*S0 in the target intermediate frequency signal SM can be verified according to the reference intermediate frequency signal SN. For example, matching is performed according to the phase of the reference intermediate frequency signal SN and the phase difference between the two intermediate frequency pulse signals S1*S0 and S2*S0 in SM. If they match, the two intermediate frequency pulse signals S1*S0 and S2*S0 do not overlap; if they do not match, they overlap.

In step 104, verify the target intermediate frequency signal according to the reference intermediate frequency signal, control the first pulse generator to output a new first pulse signal and control the second pulse generator to output a new second pulse signal when the target intermediate frequency signal fails the verification, until the obtained target intermediate frequency signal passes the verification; calculate a distance to the measured object by using the verified target intermediate frequency signal when the obtained target intermediate frequency signal passes the verification.

In this step, when the target intermediate frequency signal SM fails the verification, the first pulse generator is controlled to output a new first pulse signal F1, and the second pulse generator is controlled to output a new second pulse signal F2. The frequency of the new first pulse signal F1 is different from that of the immediately preceding first pulse signal, and the frequency of the new second pulse signal F2 is different from that of the immediately preceding second pulse signal. That is to say, the frequency of the new first pulse signal F1 is different from that of its immediately preceding first pulse signal. The same applies to the new second pulse signal F2, whose frequency is different from that of its immediately preceding second pulse signal. In some embodiments, the new first pulse signal F1 and the new second pulse signal F2 can be arranged according to a specific frequency sequence to reduce the number of switches between the new first pulse signal F1 and the new second pulse signal F2. This allows most ranging to require only 1 to 2 switches, and only a small number of specific ranging to require more switches, thereby further improving the ranging efficiency.

In this step, after the obtained target intermediate frequency signal SM passes the verification, when the distance to the measured object 10 is calculated using the verified target intermediate frequency signal SM, ranging methods such as the phase ranging method (continuous wave modulation) and the pulse ranging method (time of flight, ToF) can be adopted, and the embodiments of this application do not specifically limit this. The embodiments of this application take the phase ranging method as an example to explain the specific implementation manner, which does not mean a limitation on the embodiments of this application.

In the ranging method provided in the above embodiment, by configuring the mixer to combine the first pulse signal F1 and the second pulse signal F2, a reference intermediate frequency signal SN is generated. Thus, the target intermediate frequency signal SM used for distance calculation can be verified according to the reference intermediate frequency signal SN. When the target intermediate frequency signal SM fails the verification, it indicates that there is a problem with the target intermediate frequency signal SM. For example, the phase difference between the intermediate frequency pulse signals of the reference optical path and the measurement optical path in the target intermediate frequency signal SM overlaps, thereby affecting the ranging result. Therefore, in the embodiment of this application, when the target intermediate frequency signal SM fails the verification, there is no need to wait for an inaccurate ranging result calculated according to the target intermediate frequency signal SM. Instead, a new first pulse signal and a new second pulse signal are output for re-ranging, which can save the time for re-ranging and thus improve the efficiency of laser ranging.

It should be noted that those skilled in the art can clearly understand that, for the convenience and conciseness of description, the specific implementation of the above-described ranging method can refer to the corresponding process in the foregoing embodiment of the laser ranging apparatus, and details are not repeated here.

Figure 11:
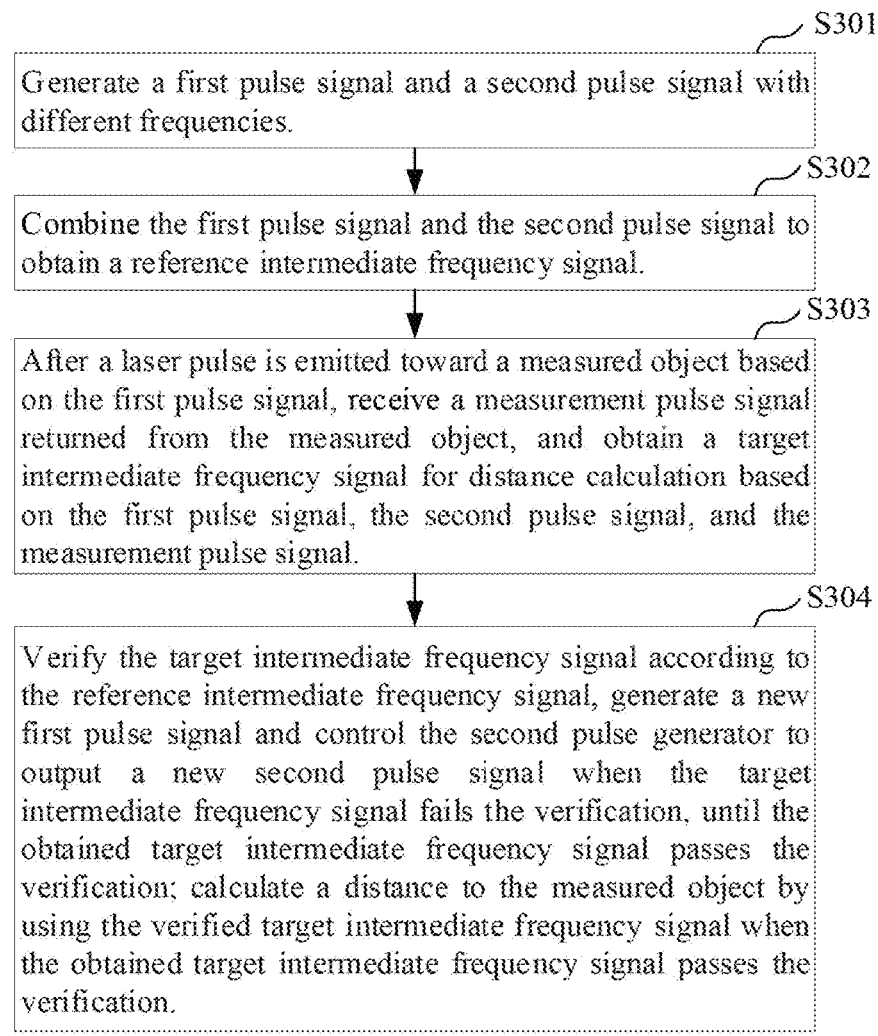
FIG. 11 is a schematic flow chart of another ranging method provided by an embodiment of this application.

Please refer to FIG. 11, FIG. 11 is a schematic flow chart of another ranging method provided by an embodiment of this application.

This ranging method can be applied to a rangefinder or a laser ranging apparatus. As shown in FIG. 11, the ranging method includes steps 301 to 304.

In step 301, generate a first pulse signal and a second pulse signal with different frequencies.

In step 302, combine the first pulse signal and the second pulse signal to obtain a reference intermediate frequency signal.

In step 303, after a laser pulse is emitted toward a measured object based on the first pulse signal, receive a measurement pulse signal returned from the measured object, and obtain a target intermediate frequency signal for distance calculation based on the first pulse signal, the second pulse signal, and the measurement pulse signal.

In step 304, verify the target intermediate frequency signal according to the reference intermediate frequency signal, generate a new first pulse signal and control the second pulse generator to output a new second pulse signal when the target intermediate frequency signal fails the verification, until the obtained target intermediate frequency signal passes the verification; calculate a distance to the measured object by using the verified target intermediate frequency signal when the obtained target intermediate frequency signal passes the verification.

The ranging method provided in the above embodiment can obtain a reference intermediate frequency signal SN by combining the first pulse signal F1 and the second pulse signal F2. Thus, the target intermediate frequency signal SM used for distance calculation can be verified according to the reference intermediate frequency signal SN. When the target intermediate frequency signal SM fails the verification, it indicates that there is a problem with the target intermediate frequency signal SM. For example, the phase difference between the intermediate frequency pulse signals of the reference optical path and the measurement optical path in the target intermediate frequency signal SM overlaps, thereby affecting the ranging result.

Therefore, in the embodiment of this application, when the target intermediate frequency signal SM fails the verification, there is no need to wait for an inaccurate ranging result calculated according to the target intermediate frequency signal SM. Instead, a new first pulse signal and a new second pulse signal are output for re-ranging, which can save the time for re-ranging and thus improve the efficiency of laser ranging.

It should be noted that those skilled in the art can clearly understand that, for the convenience and conciseness of description, the specific implementation of the above-described ranging method can refer to the corresponding process in the foregoing embodiment of the laser ranging apparatus, and details are not repeated here.

Figure 12:
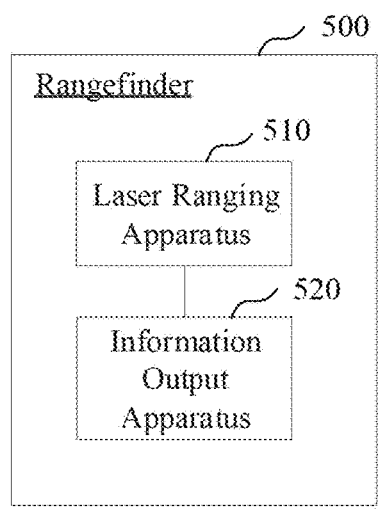
FIG. 12 is a schematic block diagram of a rangefinder provided by an embodiment of this application.

Please refer to FIG. 12, FIG. 12 is a schematic block diagram of a rangefinder provided by an embodiment of this application.

As shown in FIG. 12, the rangefinder 500 includes:

A laser ranging apparatus 510 described in the above embodiments is configured to measure a distance between the rangefinder 500 and a measured object.

An information output apparatus 520 is connected to the laser ranging apparatus 510, and configured to output the distance between the rangefinder 500 and the measured object.

Wherein the laser ranging apparatus 510 may be the laser ranging apparatus 100 described in the above embodiments, or the laser ranging apparatus 200 described in the above embodiments. The information output apparatus 520 may be a display, a device for analog electrical signals (voltage or current that changes with distance), a device for digital signals (such as TTL, RS232, RS485, etc.), or other similar devices.

In one embodiment, the laser ranging apparatus 510 includes a processor and a memory connected via a system bus. The memory may include a non-volatile storage medium and an internal memory. The non-volatile storage medium can store the operating system and a computer program. The computer program includes program instructions. When these program instructions are executed, the processor can be used to execute any ranging method. The processor is used to provide computing and control capabilities, supporting the operation of the entire laser ranging apparatus 510. The internal memory provides an environment for the operation of the computer program in the non-volatile storage medium. When the computer program is executed by the processor, it enables the processor to execute any ranging method.

It should be understood that the processor may be a Central Processing Unit (CPU). The processor may also be other general-purpose processor, a Microprocessor Unit (MPU), a Microcontroller Unit (MCU), a Digital Signal Processor (DSP), an Application Specific Integrated Circuit (ASIC), a Field-Programmable Gate Array (FPGA) or other programmable logic device, a discrete gate or transistor logic device, a discrete hardware component, etc.

In one embodiment, the laser ranging apparatus 510 includes a first pulse generator, a second pulse generator, a mixer, and a laser transceiver module. The processor is configured to execute the computer program stored in the memory to perform the following steps:

controlling the first pulse generator to output a first pulse signal, and controlling the second pulse generator to output a second pulse signal;

controlling the mixer to combine the first pulse signal and the second pulse signal to obtain a reference intermediate frequency signal;

controlling the laser transceiver module to emit a laser pulse toward a measured object based on the first pulse signal, and obtain a target intermediate frequency signal for distance calculation based on the first pulse signal, the second pulse signal, and a measurement pulse signal returned from the measured object;

verifying the target intermediate frequency signal according to the reference intermediate frequency signal, controlling the first pulse generator to output a new first pulse signal and controlling the second pulse generator to output a new second pulse signal when the target intermediate frequency signal fails the verification, until the obtained target intermediate frequency signal passes the verification; calculating a distance to the measured object by using the verified target intermediate frequency signal when the obtained target intermediate frequency signal passes the verification.

Wherein the first pulse generator and the second pulse generator may be two separate pulse generators, which are connected to the processor via interfaces such as IIC, SPI, UART, etc. They may also be different channels of the same pulse generator. The pulse generator may be implemented as a single-chip device, or obtained through pulse-shaping circuits such as AND gate, OR gate, NOT gate, flip-flops, differentiation circuits, amplification circuits, and frequency-selective circuits.

It should be noted that those skilled in the art can clearly understand that, for the convenience and conciseness of description, the specific working process of the above-described rangefinder 500 can refer to the corresponding process in the foregoing embodiment of the laser ranging apparatus or ranging method, and details are not repeated here.

In an embodiment of this application, a computer-readable storage medium is also provided. The computer-readable storage medium stores one or more computer program, and one or more computer program include program instructions. One or more processor execute program instructions. When the program instructions are executed, the method implemented may refer to each embodiment of the ranging method in this application.

The computer-readable storage medium can be an internal storage unit of the aforementioned laser ranging apparatus or rangefinder, such as the hard disk drive or memory of the laser ranging apparatus or rangefinder. The computer-readable storage medium can also be an external storage device of the laser ranging apparatus or rangefinder, such as a pluggable hard disk drive, a smart media card (SMC), a secure digital (SD) card, a flash card equipped on the laser ranging apparatus or rangefinder.

It should be further understood that the term "and/or" used in the specification and the claims of this application refers to any combination and all possible combinations of one or more of the items listed in association, and includes these combinations. It is noted that, in this application, the terms "comprise," "include," or any variation thereof are intended to cover a non-exclusive inclusion, such that a process, method, article, or system that comprises a list of elements includes not only those elements but also other elements not expressly listed or elements that are inherent to such process, method, article, or system.

The embodiments of this application have been described in detail above with reference to the accompanying drawings; however, this application is not limited to the above-mentioned embodiments. Within the scope of knowledge possessed by those of ordinary skill in the technical field to which it belongs, various changes can also be made without departing from the purpose of this application.

What is claimed is:

1. A laser ranging apparatus, comprising a processor, a first pulse generator, a second pulse generator, a mixer, and a laser transceiver module;
    the processor, configured to control the first pulse generator to output a first pulse signal and to control the second pulse generator to output a second pulse signal;
    the mixer, configured to combine the first pulse signal and the second pulse signal to generate a reference intermediate frequency signal;
    the laser transceiver module, configured to emit a laser pulse toward a measured object based on the first pulse signal, and obtain a target intermediate frequency signal for distance calculation based on the first pulse signal, the second pulse signal, and a measurement pulse signal returned from the measured object; and
    the processor, further configured to verify the target intermediate frequency signal according to the reference intermediate frequency signal; to control the first pulse generator to output a new first pulse signal and the second pulse generator to output a new second pulse signal when the target intermediate frequency signal is determined to overlap in phase with the reference intermediate frequency signal and fails a verification, updating the target intermediate frequency signal until the verification passes; to calculate a distance to the measured object by using verified the target intermediate frequency signal when the updated target intermediate frequency signal passes the verification.

2. A laser ranging apparatus according to claim 1, wherein a frequency range of the first pulse signal and the second pulse signal is 1 MHz to 250 MHz.

3. A laser ranging apparatus according to claim 1, wherein there is a frequency difference between the first pulse signal and the second pulse signal.

4. A laser ranging apparatus according to claim 3, wherein a range of the frequency difference between the first pulse signal and the second pulse signal is 500 Hz to 100 KHz.

5. A laser ranging apparatus according to claim 1, wherein a frequency of the new first pulse signal is different from that of an immediately preceding first pulse signal, or, a frequency of the new second pulse signal is different from that of an immediately preceding second pulse signal.

6. A laser ranging apparatus according to claim 1, wherein the laser transceiver module comprises a laser, an optical splitter, and a light-receiving sensor;
    the laser, configured to generate a laser pulse based on the first pulse signal;
    the optical splitter, configured to split the laser pulse into two paths, wherein one path is transmitted to the light-receiving sensor, and the other path is emitted toward the measured object; and
    the light-receiving sensor, configured to generate a reference pulse signal based on one path of split laser pulses, generate a measurement pulse signal based on a reflected laser pulse of the other path, and superimpose the reference pulse signal and the measurement pulse signal to obtain a target pulse signal; the light-receiving sensor is further configured to apply a reverse bias to the second pulse signal to obtain a local oscillator pulse signal, and mix the local oscillator pulse signal with the target pulse signal to obtain the target intermediate frequency signal.

7. A laser ranging apparatus according to claim 6, wherein a pulse peak voltage of the local oscillator pulse signal is greater than an avalanche breakdown voltage of the light-receiving sensor;
    a range of voltage differences between the pulse peak voltage and the avalanche breakdown voltage is 1V to 20V; or
    for each peak of the local oscillator pulse signal, a time range during which a corresponding voltage of the local oscillator pulse signal is greater than the avalanche breakdown voltage is 10 picoseconds to 10 nanoseconds.

8. A laser ranging apparatus according to claim 7, wherein the light-receiving sensor is a single light-receiving sensor or a light-receiving sensor array.

9. A laser ranging apparatus according to claim 7, wherein the light-receiving sensor is an Avalanche Photodiode sensor, a single Single-photon Avalanche Photodiode sensor, a Single-photon Avalanche Photodiode sensor array, a Silicon Photomultiplier sensor, or a Multi-pixel Photon Counter sensor.

10. A laser ranging apparatus according to claim 1, further comprising:
    an intermediate frequency amplifier, configured to amplify the target intermediate frequency signal and then output the amplified target intermediate frequency signal to the processor.

11. A laser ranging apparatus according to claim 10, further comprising:
    a DC removal module, configured to output a target electrical signal to the intermediate frequency amplifier, wherein the target electrical signal is used to eliminate a DC component in the intermediate frequency amplifier;
    the intermediate frequency amplifier, configured to amplify the target intermediate frequency signal and then output the amplified target intermediate frequency signal to the processor under a condition of eliminating the DC component.

12. A laser ranging apparatus according to claim 11, wherein the processor is connected to the DC removal module, the processor is configured to obtain a DC component information of the intermediate frequency amplifier and control the DC removal module to output the target electrical signal based on the DC component information.

13. A laser ranging apparatus according to claim 11, further comprising:
    a signal detection unit, connected to the intermediate frequency amplifier and configured to detect a DC component information of the intermediate frequency amplifier.

14. A rangefinder, comprising:
    a laser ranging apparatus, configured to measure a distance between the rangefinder and a measured object;

an information output apparatus, connected to the laser ranging apparatus, and configured to output the distance between the rangefinder and the measured object;

wherein the laser ranging apparatus comprises a processor, a first pulse generator, a second pulse generator, a mixer, and a laser transceiver module;

the processor, configured to control the first pulse generator to output a first pulse signal and to control the second pulse generator to output a second pulse signal;

the mixer, configured to combine the first pulse signal and the second pulse signal to generate a reference intermediate frequency signal;

the laser transceiver module, configured to emit a laser pulse toward the measured object based on the first pulse signal, and obtain a target intermediate frequency signal for distance calculation based on the first pulse signal, the second pulse signal, and a measurement pulse signal returned from the measured object; and the processor, further configured to verify the target intermediate frequency signal according to the reference intermediate frequency signal; to control the first pulse generator to output a new first pulse signal and the second pulse generator to output a new second pulse signal when the target intermediate frequency signal is determined to overlap in phase with the reference intermediate frequency signal and fails a verification, updating the target intermediate frequency signal until the verification passes; to calculate a distance to the measured object by using the verified target intermediate frequency signal when the updated target intermediate frequency signal passes the verification.

15. A ranging method, applied to a laser ranging apparatus, the laser ranging apparatus comprises a first pulse generator, a second pulse generator, a mixer, and a laser transceiver module, and the method comprises:

controlling the first pulse generator to output a first pulse signal, and controlling the second pulse generator to output a second pulse signal;

controlling the mixer to combine the first pulse signal and the second pulse signal to obtain a reference intermediate frequency signal;

controlling the laser transceiver module to emit a laser pulse toward a measured object based on the first pulse signal, and obtaining a target intermediate frequency signal for distance calculation based on the first pulse signal, the second pulse signal, and a measurement pulse signal returned from the measured object; and verifying the target intermediate frequency signal according overlap in phase with to the reference intermediate frequency signal, controlling the first pulse generator to output a new first pulse signal and controlling the second pulse generator to output a new second pulse signal when the target intermediate frequency signal fails the verification, updating the target intermediate frequency signal until the verification passes; calculating a distance to the measured object by using the verified target intermediate frequency signal when the updated target intermediate frequency signal passes the verification.

16. A ranging method according to claim 15, wherein the controlling the mixer to combine the first pulse signal and the second pulse signal to obtain a reference intermediate frequency signal comprises:

controlling the mixer to perform nonlinear mixing on the first pulse signal and the second pulse signal to obtain a reference intermediate frequency signal.

17. A ranging method according to claim 15, wherein the obtaining a target intermediate frequency signal for distance calculation based on the first pulse signal, the second pulse signal, and a measurement pulse signal returned from the measured object comprises:

generating a reference pulse signal based on one path of split laser pulses, generating a measurement pulse signal based on a reflected laser pulse of the other path, and superimposing the reference pulse signal and the measurement pulse signal to obtain a target pulse signal; and applying a reverse bias to the second pulse signal to obtain a local oscillator pulse signal, and mixing the local oscillator pulse signal with the target pulse signal to obtain a target intermediate frequency signal.

18. A ranging method according to claim 15, wherein a frequency range of the first pulse signal and the second pulse signal is 1 MHz to 250 MHz.

19. A ranging method according to claim 15, wherein there is a frequency difference between the first pulse signal and the second pulse signal.

20. A ranging method according to claim 19, wherein a range of the frequency difference between the first pulse signal and the second pulse signal is 500 Hz to 100 KHz.

* * * * *